May 17, 1932.　　J. V. MAZURIE ET AL　　1,858,961
TUBE EXPANDING MACHINE
Filed Dec. 4, 1929　　2 Sheets-Sheet 1
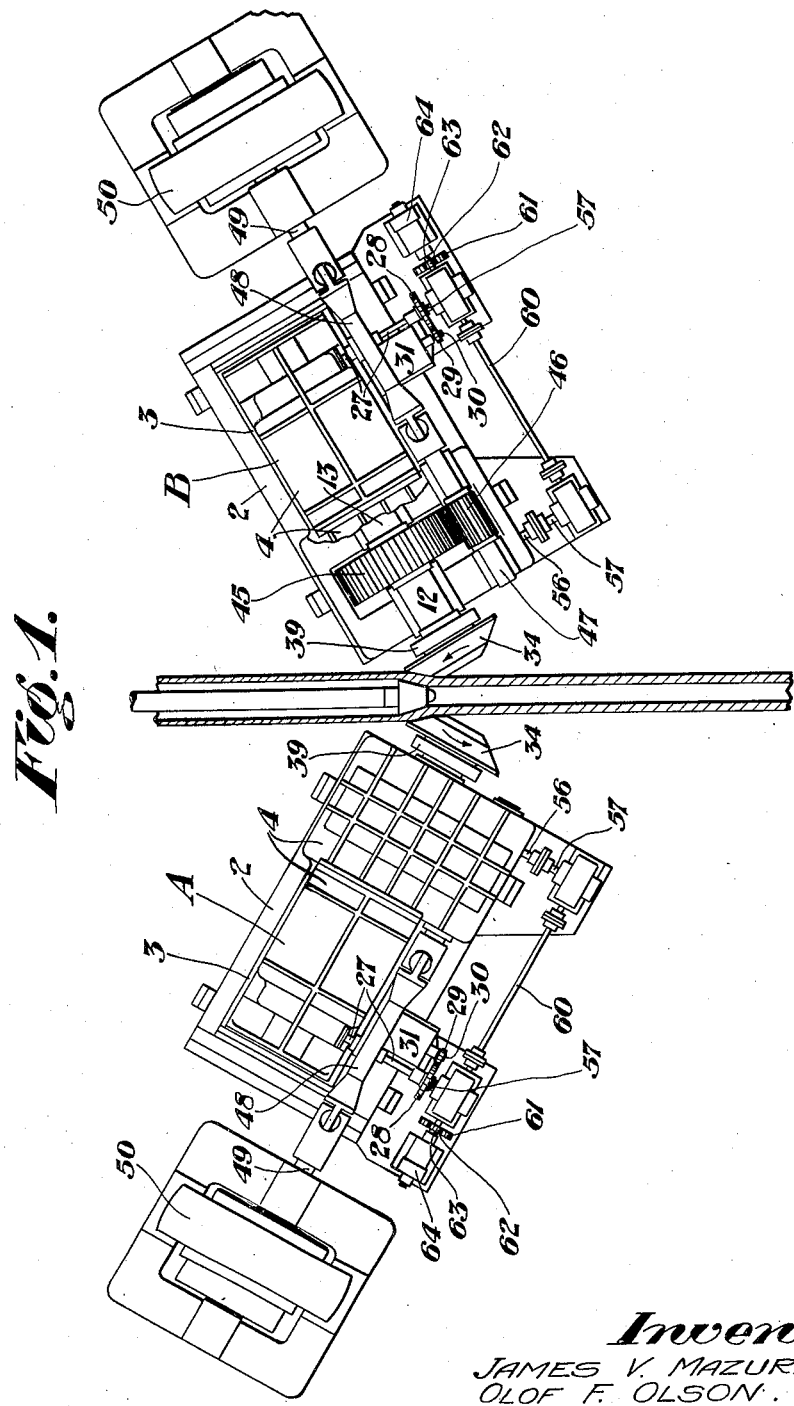
Inventors:
JAMES V. MAZURIE and
OLOF F. OLSON
by:
their Attorneys.

May 17, 1932. J. V. MAZURIE ET AL 1,858,961
TUBE EXPANDING MACHINE
Filed Dec. 4, 1929 2 Sheets-Sheet 2
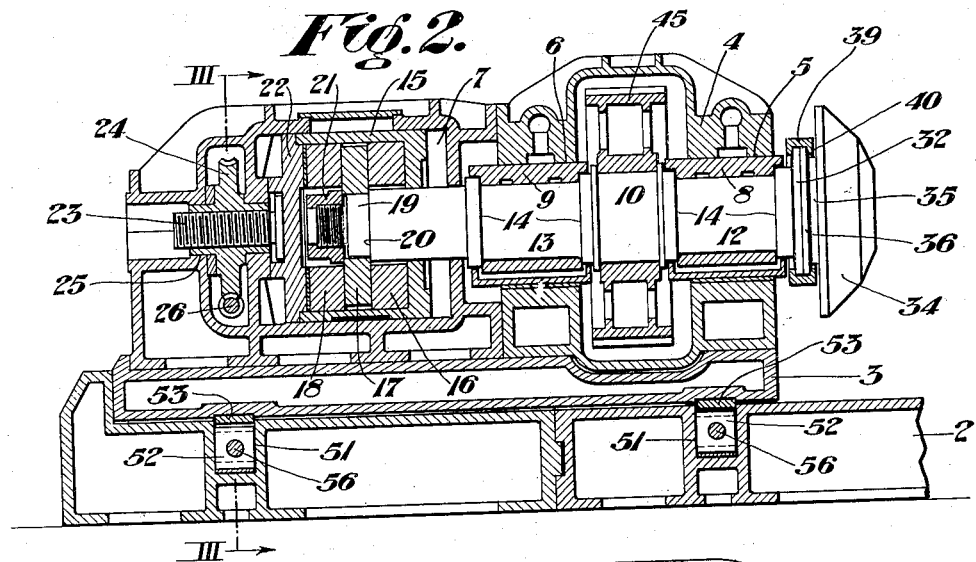
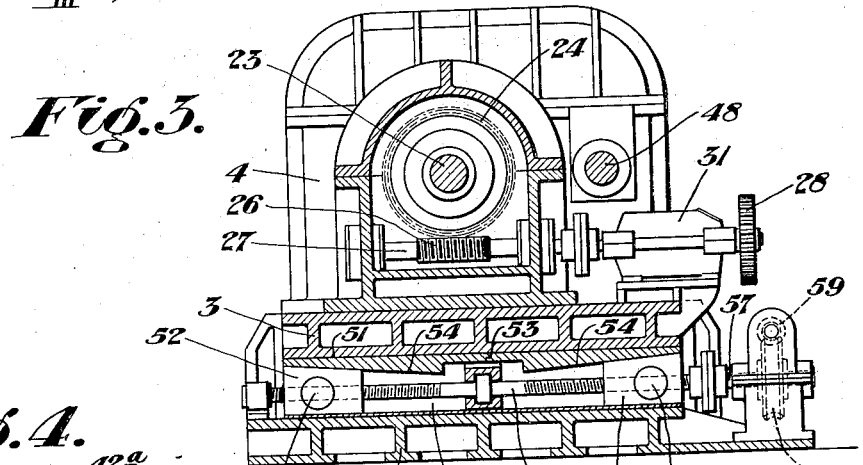
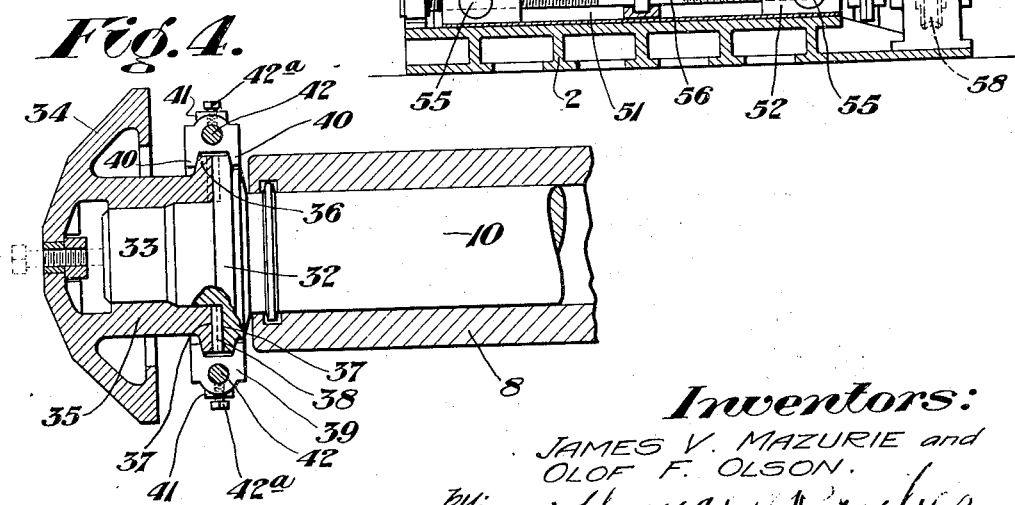
Inventors:
JAMES V. MAZURIE and
OLOF F. OLSON.
by:
their Attorneys Patented May 17, 1932

1,858,961

UNITED STATES PATENT OFFICE

JAMES V. MAZURIE AND OLOF F. OLSON, OF GARY, INDIANA, ASSIGNORS TO NATIONAL TUBE COMPANY, A CORPORATION OF NEW JERSEY

TUBE EXPANDING MACHINE

Application filed December 4, 1929. Serial No. 411,537.

This invention relates to expanding machines for seamless tube mills and more particularly to the mounting of the roll-shaft in such machines, and has for its object the provision of a novel mounting whereby the roll-shaft is fixed against vertical movement relative to its bearings.

Heretofore, it has been customary in machines of this class to mount the roll-shaft in vertically adjustable bearings and to move the shaft in a direction parallel to its longitudinal axis relative to the bearings. This movement of the shaft relative to the bearings resulted in the shaft carrying foreign matter consisting of particles of scale, dirt and other gritty matter into the bearings.

In the present constructions the bearings are fixedly mounted relative to the shaft and the shaft and bearings are bodily moved when the shaft is moved in a direction parallel to its longitudinal axis.

In the drawings—

Figure 1 is a plan view of an expanding machine constructed in accordance with this invention.

Figure 2 is an enlarged detail sectional elevation through one of the units of the machine showing the roll-shaft mounting.

Figure 3 is a sectional elevation taken on the line III—III of Figure 2.

Figure 4 is a fragmentary detail showing the roll mounting on the shaft.

Referring more particularly to the drawings, the letters A and B designate the roll units which go to make up the mill and which are of duplicate construction.

The units A and B each comprise a base 2 on which is mounted a housing bed-plate 3 supporting a housing 4.

The housing 4 is provided with bearing receiving openings 5, 6 and 7. The openings 5 and 6 are adapted to receive bearings 8 and 9 in which a roll-shaft 10 is journaled. The shaft 10 is reduced in diameter at its bearing points, as at 12 and 13, forming shoulders 14 at each end of the bearing points. The bearings 8 and 9 are divided longitudinally to form two parts which are fitted around the reduced diameter portions 12 and 13 of the shaft and said bearings are shaped to snugly fit between the shoulders 14 and thereby be held against longitudinal movement relative to the shaft. The bearings 8 and 9 have a sliding fit in the housing openings 5 and 6 and therefore the shaft 10 and bearings 8 and 9 may be bodily moved relative to the housing in a direction parallel with the longitudinal axis of the shaft.

A thrust-bearing assembly comprising a housing 15 and disks 16, 17 and 18 is slidably mounted in the opening 7 in the unit housing. The rear end of the shaft 10 extends into the bearing housing 15 and extends freely through the bearing disks 16 and 18. The disk 17 is mounted on a reduced end 19 of the shaft and clamped against a shoulder 20 by a nut 21.

The rear end of the bearing housing is closed by a thrust-plate 22 which is engaged by a threaded thrust-bar 23 which is threaded into the hub of a worm-wheel 24 journaled in a bearing opening 25 in the housing 4 and adapted to be rotated to move the thrust-bar 23 against or away from the thrust-plate 22 to thus adjust the longitudinal position of the roll-shaft 10.

The worm-wheel 24 is in mesh with a worm 26 carried by a shaft 27 which is journaled in the housing 4 and is provided at its outer end with a gear 28 which is meshed with a pinion 29 on the armature shaft 30 of a reversing motor 31.

It will thus be understood that the roll-shaft 10 may be readily adjusted longitudinally by energizing the motor 31 which will cause a rotation of the worm-wheel 24 which, in turn, serves as a nut to move the thrust-bar 23 toward or away from the thrust-bearing which bearing limits the endwise movement of the shaft 10.

In order to rotate the roll-shaft 10 a gear 45 is keyed or otherwise secured on the shaft 10 between the bearings 8 and 9, and said gear is in mesh with a drive-pinion 46 carried by a shaft 47 which is connected by a flexible coupling 48 with the armature shaft 49 of a drive-motor 50.

The head or roll end of the shaft 10 is provided with a peripheral flange 32 adjacent its end and a roll supporting stub 33 extends outwardly beyond said flange. The roll 34 which is of the usual frusto-conical type is provided with a sleeve portion 35 adapted to fit over the stub 33 and the sleeve 35 terminates in a peripheral flange 36 of the same diameter as the flange 32 on the shaft 10. The faces of the flanges 32 and 36 are parallel and abut each other. In order to prevent rotation of the roll 34 relative to the shaft 10, the abutting faces of the flanges 32 and 36 are slotted to form key-ways 37 in which keys 38 are mounted.

The roll 34 is adapted to be removably held against displacement on the shaft 10 by a two-part clamping ring 39 which is grooved to provide flanges 40 extending down over the peripheral flanges 32 and 36 of the roll 34 and roll-shaft 10.

The parts of the ring 39 are provided with bolt lugs 41 to receive the bolts 42 for securing the ring parts together. Set-screws 42ª are provided for locking bolts 42 against displacement.

It will be readily appreciated that the above construction permits quick change of the rolls and at the same time provides a secure and positive mounting.

It is necessary during the operation of the mill on different sizes of pipes to adjust the vertical position of the rolls 34 and heretofore this has been accomplished by adjusting the roll-shaft bearings vertically.

In the present construction, the roll shaft bearings and roll-shaft are so mounted that their vertical position relative to the housing is fixed and the vertical adjustment of the rolls is accomplished by adjusting the complete housing 4 and its assembled parts vertically.

In order to thus adjust the housing 4 vertically and thereby change the vertical positioning of the roll 34, the base 2 is provided with guideway grooves 51 adjacent each end in each of which are mounted a pair of oppositely positioned wedge-shaped adjusting blocks 52. The housing bed-plate 3 is provided with bearing plates 53 immediately above each of the grooves 51, which plates are provided with bearing surfaces 54 adapted to be engaged by the adjusting blocks 52 and inclined reversely to the inclined taper of the blocks 52.

When the blocks 52 are moved toward each other they will act as wedges against the inclined surfaces 54 of the plates 53 and elevate or lift the housing 4 vertically and when said blocks are moved away from each other the weight of the housing 4 and its assembled mechanism will cause the surfaces 54 of the plates 53 to ride down along the blocks 52 and thereby lower the housing and assembled mechanism.

In order to provide a simultaneous adjustment of all of the members or blocks 52 of each unit, each block is provided with a nut 55 which is in threaded engagement with a screw-shaft 56. Each of the shafts 56 is coupled to a shaft 57 having a worm-wheel 58 thereon which is meshed with a worm 59. The worms 59, in turn, have their shafts coupled to a connecting shaft 60 and the rear worm has its shaft provided with a gear 61 which is meshed with a pinion 62 on the armature shaft 63 of a reversing motor 64.

When the motor 64 is energized the screw-shafts 56 will be rotated to move the blocks 52 in or out and thus raise or lower the housing 4 and roll 34 according to the direction of rotation of the motor.

In operation, when it is desired to adjust the shaft 10 in or out of the housing, the motor 31 will be energized to cause rotation of the worm-wheel 24 to move the screw thrust-bar 23 toward or away from the thrust bearing housing 15, thus either pushing the thrust bearing, the shaft 10 and journal bearings 8 and 9 outwardly relative to the housing 4 or freeing said assembly so that it will move inwardly relative to the housing by pressure on the roll.

While we have shown and described a certain specific embodiment of our invention it will be understood that we do not wish to be limited thereto since various modifications, such as changes in the character of bearings both thrust and journal, and other power means for adjusting the shaft may be made without departing from the scope of the invention, as defined in the appended claims.

We claim—

1. In an expanding mill for expanding seamless tubes, a housing, a roll-shaft, journal bearings for said shaft, said bearings being mounted for sliding movement relative to said housing in a direction parallel with the longitudinal axis of said shaft and being held against vertical and transverse movement relative to said housing, and being fixed against longitudinal movement relative to said roll-shaft, a thrust bearing engaging the rear end of said shaft, and means for moving said thrust bearing, said shaft and said journal bearings bodily relative to said housing in a direction parallel to the longitudinal axis of said shaft.

2. In an expanding mill for expanding seamless tubes, a housing, a roll-shaft, journal bearings for said shaft, said bearings being mounted for sliding movement relative to said housing in a direction parallel with the longitudinal axis of said shaft and being held against vertical and transverse movement relative to said housing, and being fixed against longitudinal movement relative to said roll-shaft, a thrust bearing engaging the rear end of said shaft, a screw threaded plunger engaging the rear face of said thrust bearing, and power means for threading said plunger in against said thrust bearing for moving said thrust bearing, said shaft and said journal bearings bodily relative to said housing in a direction parallel to the longitudinal axis of said shaft.

3. In an expanding mill for expanding seamless tubes, a housing, a roll-shaft, journal bearings for said shaft, said bearings being mounted for sliding movement relative to said housing in a direction parallel with the longitudinal axis of said shaft and being held against vertical and transverse movement relative to said housing, and being fixed against longitudinal movement relative to said roll-shaft, a thrust bearing engaging the rear end of said shaft, a screw threaded plunger engaging the rear face of said thrust bearing, a worm-wheel journaled in said housing and having its hub bored and internally threaded to serve as a nut on said screw threaded plunger, and motor operated means for rotating said worm-wheel to move said plunger in against or away from said thrust bearing to thus force said thrust bearing, said shaft and said journal bearings to move outwardly bodily relative to said housing or to free said shaft and said bearings for inward movement bodily relative to said housing.

4. The combination with a housing of a shaft, journal bearings for said shaft, said bearings being mounted for sliding movement relative to said housing in a direction parallel with the longitudinal axis of said shaft and being held against vertical movement and transverse movement relative to said housing, means for preventing longitudinal movement of said shaft relative to said journal bearings, a thrust bearing engaging one end of said shaft and means for moving said thrust bearing, said shaft and said journal bearings bodily relative to said housing in a direction parallel to the longitudinal axis of said shaft.

5. The combination with a housing of a shaft, journal bearings for said shaft, said bearings being mounted for sliding movement relative to said housing in a direction parallel with the longitudinal axis of said shaft, and being held against vertical and transverse movement relative to said housing, means for preventing longitudinal movement of said shaft relative to said journal bearings, a thrust bearing engaging the one end of said shaft, a screw threaded plunger engaging the rear face of said bearing, and power means for threading said plunger in against said thrust bearing for moving said thrust bearing, said shaft and said journal bearings bodily relative to said housing in a direction parallel to the longitudinal axis of said shaft.

6. The combination with a housing of a shaft, journal bearings for said shaft, said bearings being mounted for sliding movement relative to said housing in a direction parallel with the longitudinal axis of said shaft and being held against vertical and transverse movement relative to said housing, means for preventing longitudinal movement of said shaft relative to said journal bearings, a thrust bearing engaging the one end of said shaft, a screw threaded plunger engaging the rear face of said bearing, a worm-wheel journaled in said housing and having its hub bored and internally threaded to serve as a nut on said screw threaded plunger, and motor operated means for rotating said worm-wheel to move said plunger in against or away from said thrust bearing to thus force said thrust bearing, said shaft and said journal bearings to move bodily relative to said housing in a direction parallel to the longitudinal axis of said shaft.

7. The combination with a shaft of journal bearings in which said shaft is journaled, a member on said shaft for preventing longitudinal movement of said shaft relative to said bearings, a thrust bearing for said shaft and means for moving said thrust bearing, said shaft and said journal bearings bodily in the direction parallel to the longitudinal axis of said shaft.

In testimony whereof, we have hereunto set our hands.

JAMES V. MAZURIE.
OLOF F. OLSON.